United States Patent [19]
Gordon

[11] 3,914,252
[45] Oct. 21, 1975

[54] PREPARATION OF N-IODOCOMPOUNDS
[75] Inventor: Ronnie D. Gordon, Richardson, Tex.
[73] Assignee: Continental Oil Company, Ponca City, Okla.
[22] Filed: Mar. 5, 1973
[21] Appl. No.: 338,115

Related U.S. Application Data
[63] Continuation-in-part of Ser. No. 124,443, March 15, 1971, abandoned.

[52] U.S. Cl....... 260/326.5 FM; 260/326; 260/404; 260/561; 260/556 FM; 260/568; 260/583 NH
[51] Int. Cl.²...................................... C07D 207/12
[58] Field of Search.......... 260/583 NH, 326.5 FM, 260/556 AR

[56] References Cited
UNITED STATES PATENTS
3,147,259   9/1964   Paterson .................... 260/326.5 X

*Primary Examiner*—Paul M. Coughlan, Jr.
*Assistant Examiner*—James H. Turnipseed
*Attorney, Agent, or Firm*—Cortlan R. Schupbach, Jr.

[57] ABSTRACT

N-iodocompounds are produced by an exchange reaction between an N-halocompound wherein the halogen is bromine or chlorine and an alkyl iodide.

4 Claims, No Drawings

PREPARATION OF N-IODOCOMPOUNDS

This is a continuation-in-part of application Ser. No. 124,443, filed Mar. 15, 1971 now abandoned.

The present invention relates to a halogen exchange process. In one aspect of the invention N-iodocompounds are produced by an exchange reaction between N-halocompounds wherein the halogen is bromine or chlorine and an alkyl iodide. In another aspect the invention relates to a novel solvent system for a halogen exchange process thereby allowing the halogen exchange process to proceed without the need of an expensive catalyst system.

N-iodocompounds have become increasingly important as intermediates in the preparation of valuable chemical compounds. For example, N-iodosuccinimides have been employed for the iodination of enol acetates in the production of steroid derivatives which have found great utility in the drug industry. However, when desired to produce such N-iodocompounds, the prior art methods have employed the use of exotic and expensive catalysts. For example, the usual method for preparation for N-iodosuccinimide requires that silversuccinimide be prepared from silver oxide and succinimide. The silversuccinimide is then reacted with iodine in a solvent medium to produce the desired compound. Thus, a need exists for a process for the preparation of N-iodocompounds without the need for expensive and exotic catalysts and complicated reaction systems. In addition, the prior art methods have not offered a flexible halogen exchange process which was commercially attractive and provided for direct synthesis of the desired N-iodocompound from readily available or easily prepared materials.

According to the present invention I have found a novel process for exchanging the halogen constituent of an N-bromocompound or N-chlorocompound with the iodine constituent of an alkyl iodide by simply contacting the N-halocompound and the alkyl iodide. Additionally, I have found that the exchange reaction may be conveniently carried out in the presence of an ether solvent. Further according to the invention, I have found a process for the production of N-iodosuccinimide by a halogen exchange reaction system which is carried out in the absence of expensive and exotic catalyst systems.

In general, the process of the invention involves the exchange of the bromine or chlorine constituent of the N-halocompound with the iodine constituent of an alkyl iodide. The N-halocompounds wherein the halogen is bromine or chlorine may be characterized as nitrogen-containing compounds containing at least one bromine or chlorine atom loosely bound to the nitrogen atom. Structurally, they may be defined by $(R)_y N(X)_z$ wherein X is bromine or chlorine, R is a moiety other than halogen, y is an integer of 1 or 2, z is an integer of 1 or 2 with the sum of y and z being 3. Some specific examples of the large variety of compounds are as follows:

N-bromosuccinimide
N-chlorosuccinimide
chloramine
bromamine
dibutyl-N-chloramine
diethyl-N-bromamine
butylpentyl-N-chloramine
cyclohexyl-N-chloramine
cyclohexyl-N-bromamine
N-chloroacetamide
N-bromoacetamide
N-chlorobenzamide
N-bromobenzamide
N-chlorostearamide
N-bromostearamide
N-chloropiperidine
N-bromo-N-acetylacetamide
N-bromophthalimide
N-chlorobutyrolactam
N,N'-dichlorodiketopiperazine
poly(N-chloroethyleneimine)
N-chlorinated proteins(e.g. soybean, leather, yeast cells)
N,N'-dibromohexamethylene diamine
N-chloro-n-heptyl-p-chloroaniline
N-chloro-N-methyl aniline
N-chloro-bis(2,6-dichlorophenyl) amine
N,N-dichloro-β-naphthylamine
N,N-dichlorobenzenesulfonamide
N-chlorobenzenesulfonamide
N-bromo-bis(phenylsulfonyl) amine
N-chlorohexanesulfonamide
N-bromo-N-butyl cyclohexyl amine
N-chloro-2-hydroxyethylamine
N,N-dibromo-2-hydroxyethylamine
N-bromo-ethyleneimine
N-chloro-dioctadecylamine
N-chloro-N-n-butylbenzamide
N,N,N',N'-tetrachloroethylene diamine
N,N'-dibromohexamethylene diamine As is apparent from the wide variety of compounds described above, any nitrogen-containing compound having one or two halogen atoms, selected from bromine and chlorine, bound directly to the nitrogen atom, and wherein such nitrogen atom is bound to other moieties only through single bonds, may be used in the present invention.

The alkyl iodide constituent employed in the halogen exchange reaction involving the N-halocompound can be any suitable alkyl iodide in which the alkyl portion contains from 1 to about 30 carbon atoms per molecule. The term alkyl as used herein encompasses primary alkyls, secondary alkyls, and cycloalkyls. Examples of suitable alkyl iodides which can be employed in the process of the present invention are: methyl iodide; ethyl iodide; propyl iodide; isopropyl iodide; 1,1-diiodopropane; 1,2-diiodopropane; 2,3-diiodopropane; butyl iodide; amyl iodide; 3-iodopentane; cyclopentyliodide; cyclohexyl iodide and the like.

The temperature and pressure at which the exchange reaction can be effected can vary widely. The temperature range will generally depend upon the particular N-halocompound and the alkyl iodide as well as the ether solvent, if employed. Normally, the exchange reaction will be carried out at ambient temperatures and autogenous pressures in order to maintain the reactants in their liquid state.

The optional ether solvent employed in the practice of the present invention can be any ether compound in which the N-halocompound and the alkyl iodide are miscible. The ether constituent can be either cyclic or acyclic in configuration. Examples of suitable cyclic ethers which can be employed are: tetrahydrofuran, dioxane, pyran and the like. Acyclic ethers which can be employed are diethyl ether, dibutyl ether, dioctyl ether, benzyl methyl ether, and the like. In general, the ether solvent may be employed on a basis of 5 to 100 mols per mol of N-halocompound.

The process of the present invention can be effected by any conventional or otherwise convenient method and may comprise a batch or a continuous type of operation. However, for simplicity reasons the process of the invention will be described in detail at it pertains to a batch type operation.

In a batch type operation for the production of N-halocompounds by an exchange reaction a molar ratio of about 1 mol of the N-halocompounds and from about 1 to 20 mols of the alkyl iodide may be charged to a reactor. The resulting reaction mixture is then agitated to insure complete and thorough contact of the constituents and to prevent any possibility of phase separation. The reaction is carried out at ambient temperatures and autogenous pressures and is agitated for a period of time effective to allow the exchange of the bromine or chlorine constituent of the reactant N-halocompound with the iodine of the alkyl iodide constituent, or until equilibrium conditions are reached in the exchange reaction. Generally the reaction time will vary from about 1 hour to about 50 hours. Desirable results have been obtained wherein the reaction mixture contains about 1 mol of N-halocompound and from about 3 to 10 mols of said alkyl iodide compound, with about 10 to 20 mols of said ether solvent when used, and the reaction is carried out for a period of time ranging from about 4 hours to about 12 hours. Once the reaction is completed the reaction mixture is withdrawn from the reactor and the desired N-iodocompound so produced is separated from the remainder of the reaction mixture by any suitable means such as distillation and the like which are well-known in the art.

In order to more fully describe the halogen exchange reaction process of the present invention, the following example is given. However, it is to be understood that such example is for illustrative purposes only and is not to be construed as a limitation of the scope of the invention.

EXAMPLE 1

An experiment was conducted involving the halogen exchange reaction in which N-bromosuccinimide was used as the N-halocompound and methyl iodide was used as the alkyl halide. 3.5 grams (0.02 mols) of N-bromosuccinimide, 11.4 grams (0.08 mols) methyl iodide, and 40 ml of dioxane were charged to a reaction vessel to form a reaction mixture. The reaction mixture was then stirred for about 18 hours. The reaction vessel was left open to the atmosphere in order to allow any methyl bromide formed to escape. The solvent was then allowed to also evaporate thus leaving a crude N-iodosuccinimide and a small amount of free iodine. The iodine was removed by sublimation leaving the desired N-iodosuccinimide which was identified from its mass spectrum. The yield of N-iodosuccinimide was about 65%.

EXAMPLE 2

N-iodopiperidine may be produced similarly as described in Example 1 using N-chloropiperidine and ethyl iodide as the reactants.

EXAMPLE 3

N-iodo-bis(2,6-dichlorophenyl)amine may be produced similarly as described in Example 1 using N-chloro-bis(2,6-dichlorphenyl)amine and 1-iodohexane as the reactants.

EXAMPLE 4

N-iodo-ethyleneimine may be produced as generally outlined in Example 1 using N-bromo-ethyleneimine and 1-iododecane as the reactants.

EXAMPLE 5

N-iodo-N-chlorobenzenesulfonamide was prepared by charging 0.047 mol (10.0g) of N,N-dichlorobenzenesulfonamide and 0.047 mol (10.0g) of 1-iodohexane to a 100 ml flask with stirring. While maintaining the temperature at about 35°C the reaction mixture was stirred overnight. Thereafter, volatile material was swept from the flask with nitrogen and GLPC analysis of the reaction mixture indicated that the 1-iodohexane had been converted to 1-chlorohexane. The reaction mixture was then filtered to remove some crystals of iodine which had formed and then rapidly shaken with dilute aqueous sodium bisulfite solution to remove any dissolved iodine. The volatiles were evaporated from the reaction mixture and the residue was worked up by dissolution in benzene, slow addition of heptane until the solution appeared cloudy, and cooled to crystallize out N-chloro-N-iodobenzenesulfonamide in about 48% yield.

EXAMPLE 6

N-iodo-2-hydroxyethylamine may be prepared similarly as described in Example 5 by reacting N-chloro-2-hydroxyethylamine with heptyl iodide.

EXAMPLE 7

N-iodo-N-methyl-p-nitroaniline may be prepared by reacting N-bromo-N-methyl-p-nitroaniline with pentyl iodide.

EXAMPLE 8

N-iodobenzenesulfonamide was prepared by charging 0.028 mol (5.0g) of N-chlorobenzenesulfonamide and 0.032 mol (4.5g) of gaseous methyl iodide to a 100 ml flask while stirring. The reaction mixture was stirred overnight while maintaining the temperature at about 35°C. Volatile material was then swept from the flask with nitrogen and the residue was dissolved in benzene with subsequent slow addition of heptane until the solution turned cloudy. Upon cooling of the mixture, N-iodobenzenesulfonamide crystallized out in a 55% yield.

Thus having described the invention in detail, it will be understood that certain variations and modifications may be made without departing from the spirit and scope of the invention as described herein and in the appended claims.

I claim:

1. A halogen exchange process which comprises reacting a N-halocompound wherein the halo group is bromine or chlorine with an alkyl iodide and recovering a N-iodocompound corresponding otherwise to the N-halocompound and an alkyl halide wherein the halide is bromine or chlorine and corresponding otherwise to the alkyl iodide, said alkyl group of the alkyl iodide having 1 to 30 carbon atoms and said N-halocompound being N-bromosuccinimide; N-chlorosuccinimide; chloroamine; bromoamine; dibutyl-N-chloroamine; diethyl-N-bromamine; butylpentyl-N-chloroamine; cyclohexyl-N-chloroamine; cyclohexyl-N-bromamine; N-chloroacetamide; N-bromoacetamide; N-chlorobenzamide; N-bromobenzamide; N-chlorostearamide; N-bromostearamide; N-chloro-N-methyl aniline; N-chloro-bis(2,6-dichlorophenyl) amine; N,N-dichloro-$\beta$-napthyamine; N,N-dichlorobenzenesulfonamide; N-chlorobenzenesulfonamide; N-bromo-bis (phenylsulfonyl) amine; N-chlorohexanesulfonamide; N-bromo-N-butyl cyclohexyl amine; N-chloro-2-hydroxyethylamine; N,N-dibromo-2-hydroxyethylamine; N-bromoethyleneimine; N-chlorodioctadecylamine; N-chloropiperidine; N-bromo-N-acetylacetamide; N-bromophthalimide; N-chlorobutyrolactam; N,N'-dichlorodiketopiperazine; poly(N-chloroethyleneimine); N-chlorinated proteins; N,N'-dibromohexamethylene diamine; N-chloro-n-heptyl-p-chloroaniline; N-chloro-N-n-butylbenzamide; N,N,N',N'-tetrachloroethylene diamine; or N-N'-dibromohexamethylene diamine.

2. A process according to claim 1 wherein the reaction is conducted in the presence of an ether solvent in which both the N-halocompound and alkyl iodide are miscible.

3. A process according to claim 1 wherein about 1–20 mols of alkyl iodide per mol of N-halocompound are employed.

4. A process according to claim 1 wherein the N-halocompound is N-bromosuccinimide.

* * * * *